US007037980B2

(12) United States Patent
Stacy et al.

(10) Patent No.: US 7,037,980 B2
(45) Date of Patent: May 2, 2006

(54) MONOVINYLARENE/CONJUGATED DIENE COPOLYMERS HAVING LOWER GLASS TRANSITION TEMPERATURES

(75) Inventors: Nathan E. Stacy, Bartlesville, OK (US); Larry L. Nash, Bartlesville, OK (US); John D. Hottovy, Bartlesville, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 72 days.

(21) Appl. No.: 10/705,704

(22) Filed: Nov. 10, 2003

(65) Prior Publication Data

US 2005/0101743 A1    May 12, 2005

(51) Int. Cl.
 *C08F 297/04* (2006.01)
(52) U.S. Cl. .............................. 525/314; 525/271
(58) Field of Classification Search ................ 525/271, 525/314
 See application file for complete search history.

(56) References Cited

U.S. PATENT DOCUMENTS

| | | | |
|---|---|---|---|
| 4,089,913 A | 5/1978 | Miki et al. | |
| 4,091,053 A | 5/1978 | Kitchen | 260/880 |
| 4,120,915 A * | 10/1978 | Fodor et al. | 524/151 |
| 4,122,134 A | 10/1978 | Miki et al. | 260/880 |
| 4,167,545 A | 9/1979 | Fahrbach et al. | |
| 4,323,606 A | 4/1982 | Buck | |
| 4,386,125 A | 5/1983 | Shiraki et al. | |
| 4,433,109 A | 2/1984 | Takeuchi et al. | 525/314 |
| 4,584,346 A | 4/1986 | Kitchen | 525/98 |
| 4,603,155 A | 7/1986 | Muramori et al. | 525/314 |
| 4,628,073 A | 12/1986 | Fisher | |
| 4,704,434 A | 11/1987 | Kitchen et al. | 525/250 |
| 4,704,435 A | 11/1987 | Kitchen | 525/250 |
| 4,939,208 A * | 7/1990 | Lanza et al. | 525/93 |
| 5,134,199 A | 7/1992 | Hattori et al. | |
| 5,223,577 A | 6/1993 | Baumgartner et al. | |
| 5,227,419 A | 7/1993 | Moczygemba et al. | 524/128 |
| 5,412,031 A * | 5/1995 | Ma et al. | 525/98 |
| 5,466,499 A | 11/1995 | Takagi et al. | |
| 5,510,423 A | 4/1996 | Van Dijk et al. | |
| 5,753,326 A | 5/1998 | Blackwelder et al. | |
| 5,756,577 A | 5/1998 | Gutierrez-Villarreal et al. | |
| 6,031,053 A | 2/2000 | Knoll et al. | |
| 6,107,411 A | 8/2000 | Toya et al. | |
| 6,265,484 B1 | 7/2001 | Trepka et al. | 525/98 |
| 6,265,485 B1 | 7/2001 | Trepka et al. | 525/98 |
| 6,270,866 B1 | 8/2001 | Okuda et al. | |
| 6,413,596 B1 | 7/2002 | Okuda et al. | |
| 6,495,643 B1 | 12/2002 | Evans et al. | |
| 6,521,712 B1 | 2/2003 | Knoll et al. | |
| 6,660,790 B1 | 12/2003 | Hoshi et al. | |
| 6,841,261 B1 | 1/2005 | Matsui et al. | |
| 2003/0013826 A1 | 1/2003 | Li et al. | 526/173 |
| 2003/0176582 A1* | 9/2003 | Bening et al. | 525/242 |

FOREIGN PATENT DOCUMENTS

| | | |
|---|---|---|
| DE | 19917675 | 10/2000 |
| EP | 0 761 704 A1 | 3/1997 |
| WO | WO02/057386 | 7/2002 |

OTHER PUBLICATIONS

Samseth et al., "Microphase-Separated Tapered Triblock Copolymers," *Journal De Physique IV* 3:59-62 ((1993).
Smith et al., "Determination of the Phase Diagram for a New Class of Block Copolymers: 'Random-Diblock' Copolymers," *Polymer Preprints* 35:651-652 (1994).
Ashraf et al., "Synthesis and Morphological Studies of Random Styrene-Diene Copolymers and 'Random-Diblock' Copolymers," *Polymer Preprints* 35:581-582 (1994).
Smith et al., "Synthesis and Characterization of PS-PI and PS-PBD Random Copolymers and 'Random-Block' Copolymers via Anionic Polymerizations," *Polymer Preprints* 34:672-673 (1993).
Smith et al., "Styrene-Diene Random Copolymers, 'Random-Diblocks' and A-(A/B)-B Triblocks," *Polymer Preprints* 37:639-640 (1996).
Smith et al., "Styrene-Diene Random Copolymers, Blends and 'Random-Diblock' Copolymers," *Polymer Preprints* 35:466-467 (1994).

(Continued)

*Primary Examiner*—Fred Teskin
(74) *Attorney, Agent, or Firm*—Raymund Eich; Joe Hulett; David Dockter

(57) ABSTRACT

We disclose a monovinylarene/conjugated diene block copolymer, comprising: (i) a random (conjugated diene$_y$/monovinylarene$_y$)$_m$ block, wherein x is about 2.5 wt % to about 10 wt %, y is from about 90 wt % to about 97.5 wt %, and x+y is about 97.5 wt % to 100 wt %; and (ii) a (conjugated diene)$_n$ block; wherein n is from about 20 wt % to about 30 wt %, m is from about 70 wt % to about 80 wt %, and m+n is from about 90 wt % to 100 wt %. We also disclose a method of forming the block copolymer and a method for fabricating an article from the block copolymer. The block copolymer typically exhibits a $T_g$ at least about 10° C. less than the $T_g$ of a reference polymer differing only in that x is about 0 wt % and y is about 100 wt %.

26 Claims, 3 Drawing Sheets

OTHER PUBLICATIONS

Jing et al., "Copolymerization of 2-Cyanomethyl-1,3-Butadiene with Styrene and Acrylonitrile," *Polymer Preprints* 41:44-45 (2000).

Xenidou et al., "Morphology of Model Multigraft Copolymers with Randomly Placed Trifunctional and Tetrafunctional Branch Points," *Polymer Preprints* 40:150-151 (1999).

Guerrero-Santos et al., "Facile Side-Chain Functionalization of Polybutadiene and its Use to Prepare Graft Copolymers," *Polymer Preprints* 40:75-76 (1999).

Markova et al., "The Range and Properties of Styrene-Butadiene Rubbers," *Polymer Preprints* 37:732 (1996).

Halasa et al., "Preparation and Characterization of a Perfectly Random Solution SBR Using Modified Organolithium Catalyst," *Polymer Preprints* 37:708-709 (1996).

Arest-Yakubovich et al., "Synthesis of High Vinyl Styrene-Butadiene Random Copolymers with a New Soluble Organosodium Initiator," *Polymer Preprints* 35:544-545 (1994).

Kendall et al., "A Fundamental Adsorption Study of Poly (styrene-B-4-hydroxybutene)s," *Polymer Preprints* 34:303-304 (1993).

Le-Khac et al., "Transparent Impact Thermoplastics Based on Highly Branched Block Polymers," *Polymer Preprints* 30:275-276 (1989).

PCT/US2004/037279 International Search Report (Mar. 7, 2005).

* cited by examiner

MONOVINYLARENE/CONJUGATED DIENE COPOLYMERS HAVING LOWER GLASS TRANSITION TEMPERATURES

BACKGROUND OF THE INVENTION

The present invention relates generally to the fields of polymer chemistry. More particularly, it concerns monovinylarene-conjugated diene copolymers with lower $T_g$ relative to reference styrene-butadiene copolymers.

Articles formed from monovinylarene-conjugated diene copolymers, such as styrene-butadiene copolymers, for example K-Resin® (Chevron Phillips Chemical Co., The Woodlands, Tex.), generally have a number of good physical properties. However, in the case of articles for which heat shrink is a desirable processing step, monovinylarene-conjugated diene copolymers are generally slightly less favorable for use, as their glass transition temperatures ($T_g$), which is the temperature at which shrinking occurs, are typically in the range of about 95° C. to about 108° C. This relatively high $T_g$ requires the use of a relatively large amount of heat to reach the temperatures at which shrinking occurs.

Therefore, it would be desirable to have monovinylarene-butadiene copolymers with lower $T_g$ and more ready heat shrink processibility.

SUMMARY OF THE INVENTION

In one embodiment, the present invention relates to a monovinylarene/conjugated diene block copolymer, comprising:

a random (conjugated diene$_x$/monovinylarene$_y$)$_m$ block, wherein x is about 2.5 wt % to about 10 wt %, y is from about 90 wt % to about 97.5 wt %, and x+y is about 97.5 wt % to 100 wt %; and a (conjugated diene)$_n$ block;

wherein n is from about 20 wt % to about 30 wt %, m is from about 70 wt % to about 80 wt %, and m+n is from about 90 wt % to 100 wt %.

In another embodiment, the present invention relates to an article, comprising the monovinylarene/conjugated diene block copolymer described above.

In a further embodiment, the present invention relates to a method of preparing a monovinylarene/conjugated diene block copolymer having a low $T_g$, comprising:

(a) charging a monovinylarene monomer, a conjugated diene monomer, an initiator, and a randomizer, allowing polymerizing to occur, to produce a random (conjugated diene$_x$/monovinylarene$_y$)$_m$ block;

(b) charging a monovinylarene monomer, a conjugated diene monomer, and an initiator, allowing polymerization to occur, to produce a monovinylarene/conjugated diene block;

(c) charging a conjugated diene monomer, and allowing polymerization to occur, to produce a (conjugated diene)n block; and (c) charging the reaction mixture with a coupling agent, to form monovinylarene/conjugated diene block copolymer.

In yet another embodiment, the present invention relates to a method of fabricating an article, comprising:

forming a monovinylarene/conjugated diene block copolymer into the article, wherein the monovinylarene/conjugated diene block copolymer is as described above.

The present invention provides monovinylarene-conjugated diene copolymers with lower $T_g$ and more ready heat shrink processibility.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
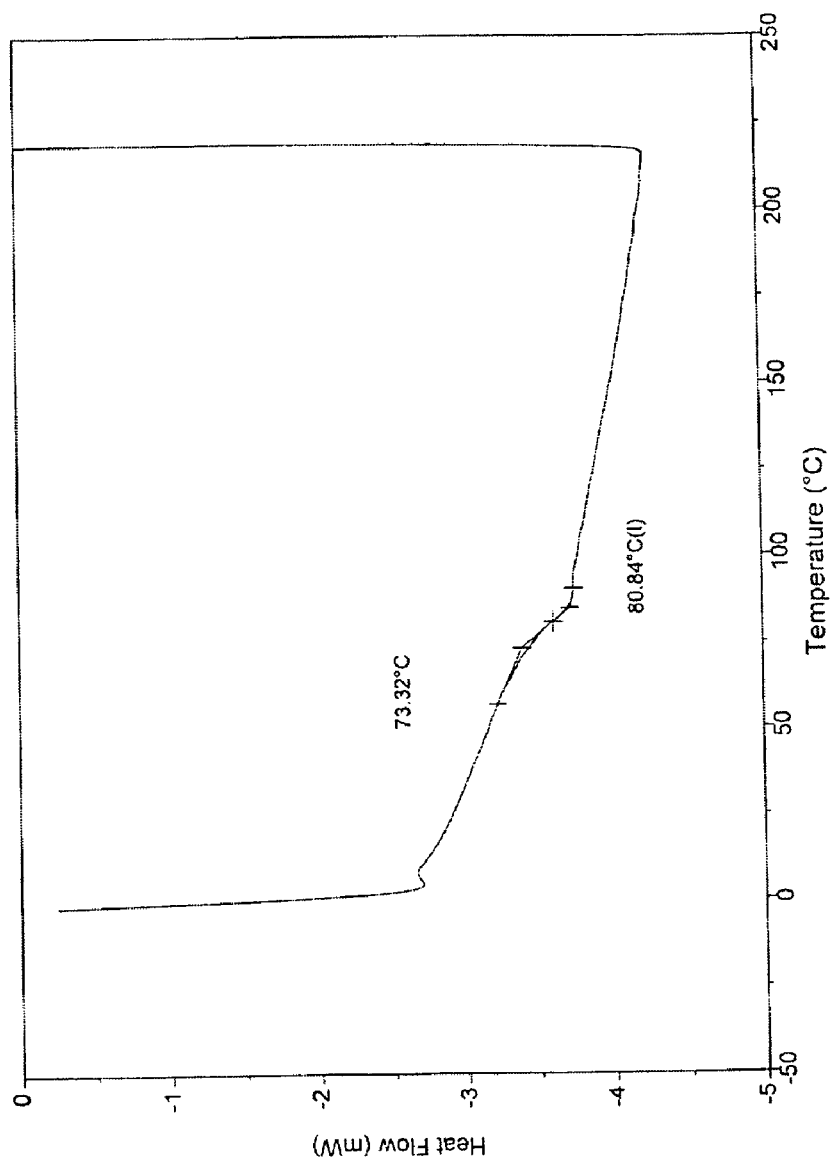
FIG. 1 shows the results of a differential scanning calorimetry (DSC) run of the polymer of Example 1.

In one embodiment, the present invention relates to a monovinylarene/conjugated diene block copolymer, comprising:

a random (conjugated diene$_x$/monovinylarene$_y$)$_m$ block, wherein x is about 2.5 wt % to about 10 wt %, y is from about 90 wt % to about 97.5 wt %, and x+y is about 97.5 wt % to 100 wt %; and a (conjugated diene)$_n$ block;

wherein n is from about 20 wt % to about 30 wt %, m is from about 70 wt % to about 80 wt %, and m+n is from about 90 wt % to 100 wt %.

The basic starting materials and polymerization conditions for preparing conjugated diene/monovinylarene block copolymers are disclosed in U.S. Pat. Nos. 4,091,053; 4,584,346; 4,704,434; 4,704,435; and 5,227,419; the disclosures of which are hereby incorporated by reference.

"Conjugated diene," as used herein, refers to an organic compound containing conjugated carbon-carbon double bonds and a total of 4 to 12 carbon atoms, such as 4 to 8 carbon atoms. Exemplary conjugated dienes include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. In one embodiment, the conjugated diene can be 1,3-butadiene or isoprene. In a further embodiment, the conjugated diene can be 1,3-butadiene. A unit of a polymer, wherein the unit is derived from polymerization of a conjugate diene monomer, is a "conjugated diene unit."

"Monovinylarene," as used herein, refers to an organic compound containing a single carbon-carbon double bond, at least one aromatic moiety, and a total of 8 to 18 carbon atoms, such as 8 to 12 carbon atoms. Exemplary monovinylarenes include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. In one embodiment, the monovinylarene is styrene. A unit of a polymer, wherein the unit is derived from polymerization of a monovinylarene monomer, is a "monovinylarene unit."

In the polymer of the present invention, the random (conjugated diene$_x$/monovinylarene$_y$)$_m$ block comprises conjugated diene units and monovinylarene units. The block is "random" in that the probability of any particular unit being a conjugated diene unit or a monovinylarene unit is substantially the same as the mole fractions of conjugated diene and monovinylarene in the block. This does not preclude the possibility of short stretches of the block having regularity (i.e., appearing non-random), but such regular stretches will typically be present at no more than about the level expected by chance.

In the random (conjugated diene$_x$/monovinylarene$_y$)$_m$ block, the conjugated diene units can be present at a weight fraction x, wherein x can be about 2.5 wt % to about 10 wt %, and the monovinylarene units can be present at a weight fraction y, wherein y can be from about 90 wt % to about 97.5 wt %.

In one embodiment, x can be about 5 wt % to about 10 wt %.

In one embodiment, y can be about 90 wt % to about 95 wt %.

As will be apparent to the skilled artisan, x+y can be less than or equal to 100 wt %. In one embodiment, x+y can be about 97.5 wt % to 100 wt %.

In the event that x+y is less than 100 wt %, the balance of the weight fraction of the random (conjugated diene$_x$/monovinylarene$_y$)$_m$ block can comprise one or more other units. Any other units that are capable of inclusion in a polymer by vinyl addition polymerization can be the other units providing the balance of the weight fraction of the random (conjugated diene$_x$/monovinylarene$_y$)$_m$ block.

The (conjugated diene)$_n$ block comprises conjugated diene units, and can also comprise a small amount (less than about 1 wt %) of one or more other units. Any other units that are capable of inclusion in a polymer by vinyl addition polymerization can be the other units comprising the small amount of the (conjugated diene)$_n$ block.

The proportions of the random (conjugated diene$_x$/monovinylarene$_y$)$_m$ block and the (conjugated diene)$_n$ block can be defined by their weight fractions, m and n.

In one embodiment, n can be from about 5 wt % to about 45 wt % and m can be from about 55 wt % to about 95 wt %. In a further embodiment, n can be from about 20 wt % to about 30 wt % and m can be from about 70 wt % to about 80 wt %. In another embodiment, n can be about 25 wt % and m can be about 75 wt %.

As will be apparent to the skilled artisan, m+n can be less than or equal to 100 wt %. In one embodiment, m+n can be from about 90 wt % to 100 wt %.

In the event that m+n is less than 100 wt %, the balance of the weight fraction of the copolymer can comprise one or more other blocks. Any other blocks that are capable of inclusion in a block copolymer by vinyl addition polymerization can be the other blocks providing the balance of the weight fraction of the copolymer. An example of such a block is, but is not limited to, a polymonovinylarene block.

The inventive polymer contains at least one random (conjugated diene$_x$/monovinylarene$_y$)$_m$ block and at least one (conjugated diene)$_n$ block. The blocks can be incorporated sequentially into the polymer in any order. The inventive polymer can contain more than one random (conjugated diene$_x$/monovinylarene$_y$)$_m$ block, more than one (conjugated diene)$_n$ block, or both. If a plurality of either or both type of block is present, the blocks can be incorporated sequentially into the polymer in any order (e.g., alternating between the random block and the conjugated diene block, or present in a sequence of blocks of one type followed by a sequence of blocks of another type, among other incorporation sequences).

Generally, each block is formed by polymerizing the monomer or mixture of monomers from which the desired units of the block are derived. The polymerization process will generally be amenable to a relative lack of change in process parameters between different blocks, but the skilled artisan, having the benefit of the present disclosure, may make some minor changes in process parameters between different blocks as a matter of routine experimentation. The following descriptions of the polymerization process will generally apply to the formation of all types of blocks in the inventive polymer, although certain descriptions may be of more or less value to forming one or more of the types of blocks in the inventive polymer.

The polymerization process can be carried out in a hydrocarbon diluent at any suitable temperature in the range of from about −100° C. to about 150° C., such as from about 0° C. to about 150° C., and at a pressure sufficient to maintain the reaction mixture substantially in the liquid phase. In one embodiment, the hydrocarbon diluent can be a linear or cyclic paraffin, or mixtures thereof. Exemplary linear or cyclic paraffins include, but are not limited to, pentane, hexane, octane, cyclopentane, cyclohexane, and mixtures thereof, among others. In one embodiment, the paraffin is cyclohexane.

The polymerization process can be carried out in the substantial absence of oxygen and water, such as under an inert gas atmosphere.

The polymerization process can be performed in the presence of an initiator. In one embodiment, the initiator can be any organomonoalkali metal compound known for use as an initiator. In a further embodiment, the initiator can have the formula RM, wherein R is an alkyl, cycloalkyl, or aryl radical containing 4 to 8 carbon atoms, such as an n-butyl radical, and M is an alkali metal, such as lithium. In a particular embodiment, the initiator is n-butyl lithium.

The amount of initiator employed depends upon the desired polymer or block molecular weight, as is known in the art and is readily determinable, making due allowance for traces of poisons in the feed streams. In one embodiment, the initiator can be present in an amount in the range of from about 0.01 phm (parts by weight per hundred parts by weight of total monomer) to about 1.0 phm. In another embodiment, the initiator can be present in an amount in the range of from about 0.01 phm to about 0.5 phm. In a further embodiment, the initiator can be present in an amount in the range of from about 0.01 phm to 0.2 phm.

The polymerization process can further involve the inclusion of small amounts of randomizers. In one embodiment, the randomizer can be a polar organic compound, such as an ether, a thioether, or a tertiary amine. In another embodiment, the randomizer can be a potassium salt or a sodium salt of an alcohol. The randomizer can be included in the hydrocarbon diluent to improve the effectiveness of the initiator, to randomize at least part of the monovinylarene monomer in a mixed monomer charge, or both. The inclusion of a randomizer can be of value when forming a random (conjugated diene$_x$/monovinylarene$_y$)$_m$ block of the present polymer. Exemplary randomizers include, but are not limited to, dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetramethylene oxide (tetrahydrofuran or THF), potassium tert-amylate (KTA), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, N,N-di-methylaniline, N-methyl-N-ethylaniline, N-methylmorpholine, and mixtures thereof, among others.

In one embodiment, the randomizer is tetrahydrofuran. When employing tetrahydrofuran, the tetrahydrofuran is generally present in an amount in the range of from about 0.01 phm to about 1.0 phm, such as from about 0.02 phm to about 1.0 phm.

In another embodiment, the randomizer is potassium tert-amylate (KTA). When employing KTA, the KTA is generally present in an amount in the range of from about 0.01 phm to about 1.0 phm, such as from about 0.1 phm to about 1.0 phm.

When forming a particular block, each monomer charge or monomer mixture charge is polymerized under solution polymerization conditions such that the polymerization of each monomer charge or monomer mixture charge, to form the particular block, is substantially complete before charging a subsequent charge. "Charging," as used herein, refers to the introduction of a compound to a reaction zone, such as the interior of a reactor vessel.

A coupling agent can be added after polymerization is complete. Suitable coupling agents include, but are not limited to, di- or multivinylarene compounds; di- or multiepoxides; di- or multiisocyanates; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures of two or more such compounds, among others.

Useful multifunctional coupling agents include, but are not limited to, epoxidized vegetable oils such as epoxidized soybean oil, epoxidized linseed oil, and mixtures thereof, among others. In one embodiment, the coupling agent is epoxidized soybean oil. Epoxidized vegetable oils are commercially available under the tradename Vikoflex® from Atofina Chemicals (Philadelphia, Pa.).

Any effective amount of the coupling agent can be employed. In one embodiment, a stoichiometric amount of the coupling agent relative to active polymer alkali metal tends to promote maximum coupling. However, more or less than stoichiometric amounts can be used for varying coupling efficiency where desired for particular products. Typically the total amount of coupling agent employed in the polymerization is in the range of from about 0.1 phm to about 20 phm, such as from about 0.1 phm to about 5 phm, or from about 0.1 phm to about 2 phm.

Following completion of the coupling reaction, the polymerization reaction mixture can be treated with a terminating agent such as water, alcohol, phenols, or linear saturated aliphatic mono-dicarboxylic acids, to remove alkali metal from the block copolymer and for color control. In one embodiment, the terminating agent is a mixture of water and carbon dioxide.

After termination, the polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

The block copolymer can be recovered and worked into a desired shape, such as by milling, extrusion, or injection molding. The block copolymer can also contain additives such as antioxidants, antiblocking agents, release agents, fillers, extenders, and dyes, and the like.

In specific polymerization processes, typical initiator, monomer and monomer mixture charge sequences include, but are not limited to, the following.

Charging Embodiment 1:
(a) randomizer, initiator, conjugated diene/monovinylarene monomer mixture
(b) initiator, conjugated diene/monovinylarene monomer mixture
(c) conjugated diene monomer
(d) coupling agent Charging Embodiment 2:
(a) initiator, monovinylarene monomer
(b) randomizer, initiator, conjugated diene/monovinylarene monomer mixture
(c) conjugated diene monomer
(d) randomizer, initiator, conjugated diene/monovinylarene monomer mixture
(e) conjugated diene monomer
(f) coupling agent In other embodiments, the monovinylarene/conjugated diene block copolymer of the present invention can comprise the following structures, wherein (B/S) is a random monovinylarene/conjugated diene block; <B/S> is a tapered monovinylarene/conjugated diene block; B is a conjugated diene block; S is a monovinylarene block; CA is a coupling agent residue; and — is a covalent linkage between blocks.

(B/S)-(B/S)-B-CA
(B/S)-B-CA
(B/S)-(B/S)-B-(B/S)-B-CA
(B/S)-B-(B/S)-B-CA
S-(B/S)-B-(B/S)-B-CA
<B/S>1-<B/S>2-<B/S>3-<B/S>4-<B/S>5-CA
<B/S>2-<B/S>3-<B/S>4-<B/S>5-CA
(B/S)1-(B/S)2-<B/S>3-<B/S>4-<B/S>5-CA
(B/S)1-(B/S)2-(B/S)3-(B/S)4-(B/S)5-CA;

wherein <B/S>1, <B/S>2, (B/S)1, and (B/S)2 each have a conjugated diene content from about 2.5 wt % to about 10 wt %, and <B/S>3, <B/S>4, <B/S>5, (B/S)3, (B/S)4, and (B/S)5 each have a conjugated diene content from about 30 wt % to about 70 wt %.

A monovinylarene/conjugated diene block copolymer of the present invention can have a $T_g$ of at least about 10° C. less than the $T_g$ of a reference polymer differing only in x being about 0 wt % and y being about 100 wt %.

$T_g$ is the glass transition temperature of a polymer, i.e., the temperature below which the polymer is in a relatively hard and brittle glass-like state, and above which the polymer is in a relatively soft and flexible plastic-like state. $T_g$ can be measured by known techniques and apparatus, such as differential scanning calorimetry (DSC). Each polymer inherently has a glass transition temperature.

A reference polymer, as used herein, is a polymer identical to a monovinylarene/conjugated diene block copolymer of the present invention, in terms of the block identities and the values of m and n. The reference polymer differs only in x being about 0 wt % and y being about 100 wt % (i.e., instead of a random (conjugated diene$_x$/monovinylarene$_y$)$_m$ block, the reference polymer has a block that consists essentially of monovinylarene).

As stated above, in one embodiment, the monovinylarene/conjugated diene block copolymer of the present invention can have a $T_g$ at least about 10° C. less than the $T_g$ of the reference polymer. In another embodiment, the monovinylarene/conjugated diene block copolymer can have a $T_g$ at least about 20° C. less than the $T_g$ of the reference polymer. In a further embodiment, the monovinylarene/conjugated diene block copolymer can have a $T_g$ at least about 30° C. less than the $T_g$ of the reference polymer.

Such lower $T_g$ allows easier processing of monovinylarene/conjugated diene copolymers to form shrink films, among other articles.

In one embodiment, the present invention relates to an article, comprising the monovinylarene/conjugated diene block copolymer described above.

The article can be any article which can be fabricated, in whole or in part, from a monovinylarene/conjugated diene block copolymer known in the art, such as the styrene/butadiene copolymer available under the tradename K-Resin® (Chevron Phillips Chemical Co., The Woodlands, Tex.).

Exemplary articles include, but are not limited to, containers, medical packaging, medical devices, toys, garment hangers, and flexible and rigid packaging, among others.

In one embodiment, the article is a shrink film, defined as a film that can shrink upon exposure to temperatures of about 60° C. to about 80° C.

In another embodiment, the present invention relates to a method of preparing a monovinylarene/conjugated diene block copolymer having a low $T_g$, comprising:

(a) charging a monovinylarene monomer, a conjugated diene monomer, an initiator, and a randomizer, allowing polymerizing to occur, to produce a reaction mixture comprising a random (conjugated diene$_x$/monovinylarene$_y$)$_m$ block;

(b) charging an initiator and a conjugated diene monomer, and allowing polymerization to occur, to produce a reaction mixture comprising a (conjugated diene)$_n$ block; and (c) charging the reaction mixture with a coupling agent, to form monovinylarene/conjugated diene block copolymer.

The charging steps (a)–(c) can be performed in accordance with the description set forth above. The proportions of the various components to be added in each of the charging steps is a matter of routine experimentation to the skilled artisan having benefit of the present disclosure.

In one embodiment, the proportions of the components in charging step (a) can be chosen such that, in the product block, x is about 2.5 wt % to about 10 wt %, y is from about 90 wt % to about 97.5 wt %, and x+y is about 97.5 wt % to 100 wt %.

In one embodiment, the proportions of the components in charging steps (a) and (b) can be chosen such that, in the product polymer, n is from about 20 wt % to about 30 wt %, m is from about 70 wt % to about 80 wt %, and m +n is from about 90 wt % to 100 wt %.

The sequence of steps (a) and (b) can be varied, and either or both of steps (a) and (b) can be performed one or more times.

In another embodiment, the present invention relates to a method of fabricating an article, comprising:

forming a monovinylarene/conjugated diene block copolymer into the article, wherein the monovinylarene/conjugated diene block copolymer is as described above.

The article can be any article referred to above.

In the forming step, the polymer can be formed into the article or a component thereof by any appropriate technique. Examples of appropriate techniques include, but are not limited to, sheet extrusion, thermoforming, injection molding, blow molding, film blowing, and film casting, among others. Selection of a forming technique is a matter of routine experimentation for the skilled artisan having the benefit of the present disclosure.

The following examples are included to demonstrate particular embodiments of the invention. It should be appreciated by those of skill in the art that the techniques disclosed in the examples which follow represent techniques discovered by the inventor to function well in the practice of the invention. However, those of skill in the art should, in light of the present disclosure, appreciate that many changes can be made in the specific embodiments which are disclosed and still obtain a like or similar result without departing from the spirit and scope of the invention.

EXAMPLES 1–2

Synthesis of Random (Conjugated diene$_x$/monovinylarene$_y$)$_m$/(conjugated diene)$_n$ Block Copolymers Two block copolymers were synthesized, as follows:

EXAMPLE 1

| Compound charged | Amount charged (wt/vol units) | Time when Charged (min) | Reactor Temp (° C.) |
|---|---|---|---|
| Cyclohexane | 6.9 lbs | 0.0 | 87.8 |
| Tetrahydrofuran (THF) | 4 cc (0.04 PHM) | 2.7 | 40.3 |
| Potassium tert-amylate (KTA) | 5.6 cc (0.23 PHM) | 2.8 | 41.6 |
| n-butyl lithium | 72.5 g (0.072 PHM) | 3.0 | 43.0 |
| butadiene/styrene mixture | 50.1 g/690 g (2.5/34.5 PHM) | 4.1 | 48.5 |
| butadiene/styrene mixture | 20.1 g/300.4 g (1.0/15.0 PHM) | 16.2 | 62.9 |
| n-butyl lithium | 77.5 g (0.076 PHM) | 30.3 | 62.4 |
| butadiene/styrene mixture | 30.2 g/411.7 g (1.5/20.5 PHM) | 31.3 | 61.2 |
| butadiene | 500.8 g (25 PHM) | 43.4 | 64.1 |
| Vikoflex ® (epoxidized soybean oil) | 16.4 g (0.4 PHM) | 61.4 | 86.9 |
| $H_2O$ | 4.5 cc (0.2 PHM) | 78.0 | 91.7 |
| $CO_2$ | 0.4 PHM | 89.6 | 92.6 |
| TNPP | 0.5 PHM | 112.1 | 93.5 |
| Irganox 1010 ® | 0.2 PHM | 115.8 | 93.6 |

In addition to the above, each charge after the initial cyclohexane charge was followed with 0.2 lb cyclohexane (total cyclohexane at end of run was 9.0 lb).

EXAMPLE 2

| Compound charged | Amount charged (wt/vol units) | Time when Charged (min) | Reactor Temp (° C.) |
|---|---|---|---|
| Cyclohexane | 6.9 lbs | 0.0 | 65.7 |
| THF | 4 cc (0.04 PHM) | 2.5 | 36.1 |
| KTA | 5.6 cc (0.23 PHM) | 2.6 | 37.4 |
| n-butyl lithium | 73.1 g (0.072 PHM) | 2.9 | 39.7 |
| butadiene/styrene mixture | 100.3 g/640.7 g (5/32 PHM) | 3.9 | 44.1 |
| butadiene/styrene mixture | 40.2 g/280.2 g (2/14 PHM) | 17.2 | 62.7 |
| n-butyl lithium | 77.9 g (0.076 PHM) | 30.7 | 63.4 |
| butadiene/styrene mixture | 60.4 g/382.4 g (3/19 PHM) | 32.0 | 61.9 |
| butadiene | 500.4 g (25 PHM) | 44.1 | 65.6 |
| Vikoflex ® | 17 g (0.4 PHM) | 61.5 | 88.4 |
| $H_2O$ | 4.5 cc (0.2 PHM) | 78.1 | 91.7 |
| $CO_2$ | 0.4 PHM | 89.2 | 92.4 |
| TNPP | 0.5 PHM | 116.2 | 93.4 |
| Irganox 1010 ® | 0.2 PHM | 118.5 | 93.4 |

In addition to the above, each charge after the initial cyclohexane charge was followed with 0.2 lb cyclohexane (total cyclohexane at end of run was 9.0 lb).

In both examples, at 5 min after the final charge, the contents of the reaction vessel were transferred to a blowdown vessel containing 3 g Be Square Wax (added before preheating of the blowdown vessel). The reactor and all lines were rinsed with 0.5 lb cyclohexane, and the rinse was transferred to the blowdown vessel. The blowdown vessel was then heated to 178° C., and the polymer was flashed to yield a polymer rope. The polymer rope was dried in a vacuum oven (about 180° F. to about 184° F.) for 2.5 hr, chopped, and reserved for further study.

Comparative Example 3

Synthesis of Reference Polymer

| Compound charged | Amount charged (wt/vol units) | Time when Charged (min) | Reactor Temp (° C.) |
|---|---|---|---|
| Cyclohexane | 6.9 lbs | 0.0 | 97.3 |
| THF | 4 cc (0.04 PHM) | 3.4 | 43.8 |
| n-butyl lithium | 85.3 g (0.085 PHM) | 3.4 | 43.8 |
| styrene | 751.3 g (37.5 PHM) | 6.4 | 45.0 |
| styrene | 321.2 g (16.0 PHM) | 18.4 | 63.7 |
| n-butyl lithium | 69.8 g (0.07 PHM) | 32.3 | 63.1 |
| styrene | 440.9 g (22 PHM) | 36.0 | 61.2 |
| butadiene | 500.2 g (25 PHM) | 48.0 | 62.4 |
| Vikoflex ® | 16.0 g (0.4 PHM) | 64.1 | 90.1 |
| $H_2O$ | 4.5 cc (0.2 PHM) | 83.2 | 95.4 |
| $CO_2$ | 0.2 PHM | 93.2 | 96.4 |
| TNPP | 0.5 PHM | 113.2 | 97.6 |
| Irganox 1010 ® | 0.2 PHM | 113.2 | 97.6 |

In addition to the above, each charge after the initial cyclohexane charge was followed with 0.2 lb cyclohexane (total cyclohexane at end of run was 9.0 lb).

After the reaction, the polymer was retrieved and processed by the same procedure described for Examples 1–2, above.

EXAMPLES 4–5 AND COMPARATIVE EXAMPLE 6

$T_g$ of Both Random (Conjugated diene$_x$/monovinylarene$_y$)$_m$/(conjugated diene)$_n$ Block Copolymers and a Reference Polymer Differential scanning calorimetry (DSC) was performed on the polymers generated in Examples 1–2, and a comparative reference polymer having styrene blocks of essentially the same number and weight as the random butadiene/styrene blocks of the polymers of Examples 1–2. The $T_g$ of each polymer was determined through standard techniques for analysis of heat flow vs. temperature graphs generated by DSC.

EXAMPLE 4

The polymer of Example 1 was subjected to DSC. The results are shown in FIG. 1. The $T_g$ was 73.32° C.

EXAMPLE 5

Figure 2:
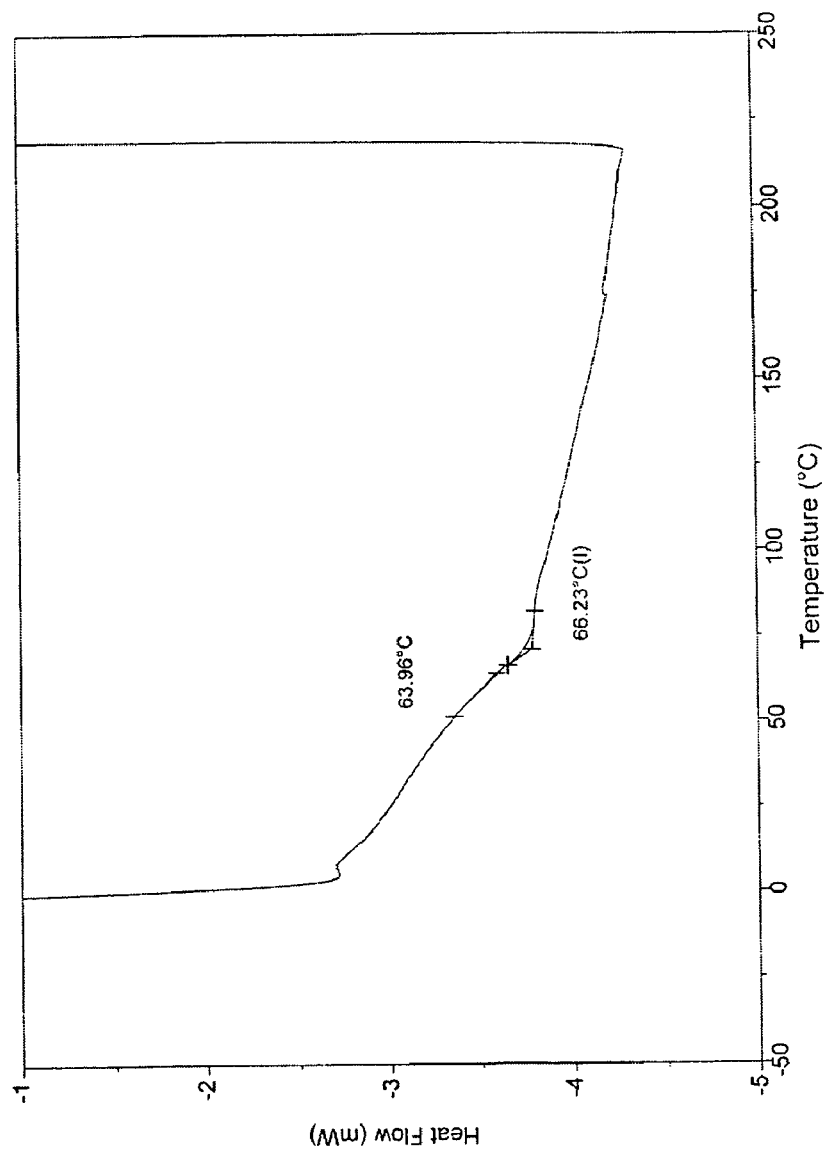
FIG. 2 shows the results of a DSC run of the polymer of Example 2.

The polymer of Example 2 was subjected to DSC. The results are shown in FIG. 2. The $T_g$ was 63.96° C.

Comparative Example 6

Figure 3:
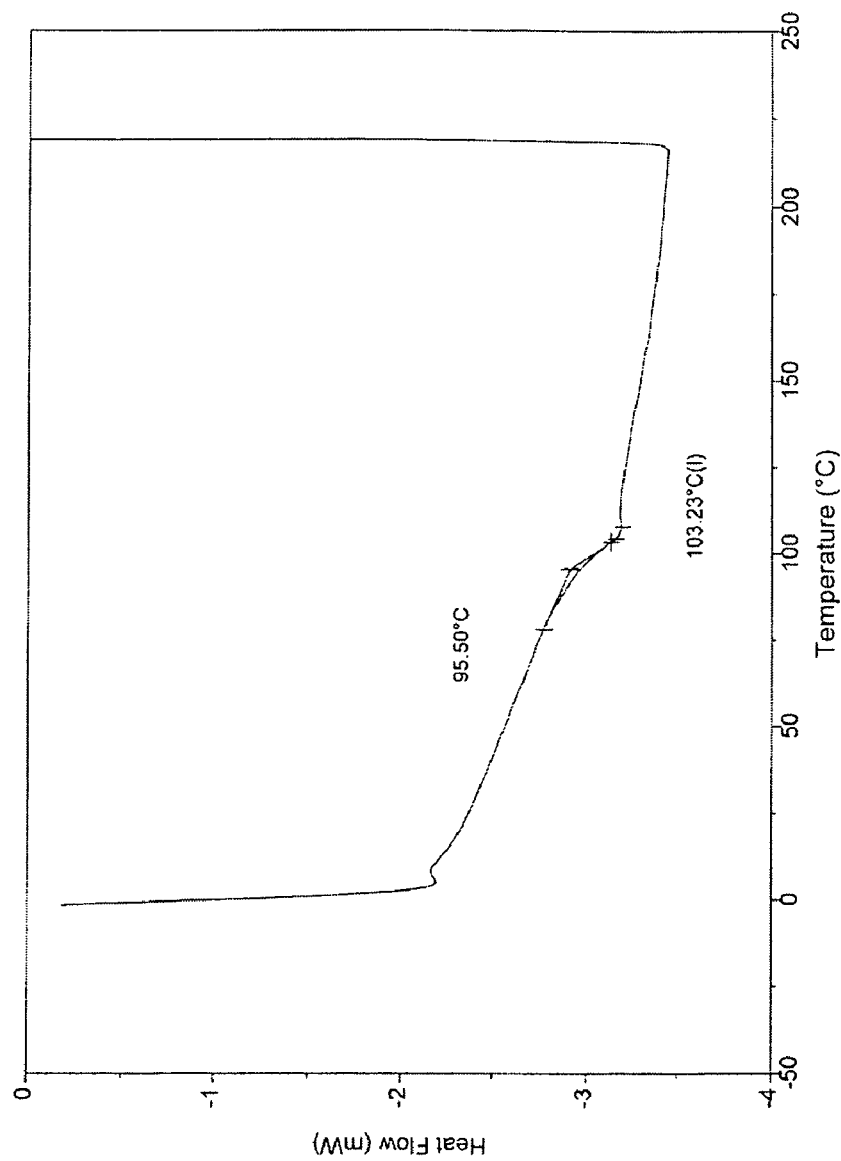
FIG. 3 shows the results of a DSC run of the polymer of Comparative Example 5, a reference polymer to the polymers of Examples 1–2.

The reference polymer of Comparative Examples 3 was subjected to DSC. The results are shown in FIG. 3. The $T_g$ was 95.50° C.

The results of Examples 4–5 and Comparative Example 6 indicate that the substitution of about 5–10 wt % butadiene into the styrene blocks of a butadiene/styrene block copolymer resulted in reductions in the $T_g$ of at least about 10° C., such as about 20° C. or 30° C., relative to the reference polymer.

All of the compositions and methods disclosed and claimed herein can be made and executed without undue experimentation in light of the present disclosure. While the compositions and methods of this invention have been described in terms of particular embodiments, it will be apparent to those of skill in the art that variations may be applied to the compositions and methods and in the steps or in the sequence of steps of the method described herein without departing from the concept, spirit and scope of the invention as defined by the appended claims.

What is claimed is:

1. A monovinylarene/conjugated diene block copolymer, comprising:
   a random (conjugated diene$_x$/monovinylarene$_y$)$_m$ block, wherein x is about 2.5 wt % to about 10 wt %, y is from about 90 wt % to about 97.5 wt %, and x+y is about 97.5 wt % to 100 wt %; and
   a (conjugated diene)$_n$ block;
   wherein n is from about 20 wt % to about 30 wt %, m is from about 70 wt % to about 80 wt %, and m+n is from about 90 wt % to 100 wt %.

2. The monovinylarene/conjugated diene block copolymer of claim 1, wherein x is about 5 wt % to about 10 wt %.

3. The monovinylarene/conjugated diene block copolymer of claim 1, wherein y is about 90 wt % to about 95 wt %.

4. The monovinylarene/conjugated diene block copolymer of claim 1, wherein n is about 25 wt % and m is about 75 wt %.

5. The monovinylarene/conjugated diene block copolymer of claim 1, wherein the $T_g$ is at least about 10° C. less than the $T_g$ of a reference polymer differing only in x being about 0 wt % and y being about 100 wt %.

6. The monovinylarene/conjugated diene block copolymer of claim 5, wherein the $T_g$ is at least about 20° C. less than the $T_g$ of the reference polymer.

7. The monovinylarene/conjugated diene block copolymer of claim 6, wherein the $T_g$ is at least about 30° C. less than the $T_g$ of the reference polymer.

8. The monovinylarene/conjugated diene block copolymer of claim 1, further comprising a monovinylarene/conjugated diene block.

9. The monovinylarene/conjugated diene block copolymer of claim 1, further comprising a monovinylarene block.

10. An article, comprising the monovinylarene/conjugated diene block copolymer of claim 1.

11. The article of claim 10, wherein the article is a shrink film.

12. A method of preparing a monovinylarene/conjugated diene block copolymer comprising:
   (a) charging a monovinylarene monomer, a conjugated diene monomer, an initiator, and a randomizer, allowing polymerizing to occur, to produce a random (conjugated diene$_x$/monovinylarene$_y$)$_m$ block; wherein x is about 2.5 wt % to about 10 wt %, y is from about 90 wt % to about 97.5 wt %, and x+y is about 97.5 wt % to 100 wt %, and m is from about 70 wt % to about 80 wt %;
(b) charging a monovinylarene monomer, a conjugated diene monomer, and an initiator, allowing polymerization to occur, to produce a monovinylarene/conjugated diene block;
(c) charging a conjugated diene monomer, and allowing polymerization to occur, to produce a (conjugated diene)$_n$ block, wherein n is from about 20 wt % to about 30 wt % and m+n is from about 90 wt % to 100 wt %; and
(d) charging the reaction mixture with a coupling agent, to form monovinylarene/conjugated diene block copolymer.

13. A monovinylarene/conjugated diene block copolymer, produced according to the method of claim 12.

14. A method of preparing a monovinylarene/conjugated diene block copolymer comprising:
(a) charging an initiator and a monovinylarene monomer and allowing polymerization to occur, to produce a monovinylarene block;
(b) charging a randomizer, an initiator, and a conjugated diene/monovinylarene monomer mixture and allowing polymerization to occur, to produce a random (conjugated diene$_x$/monovinylarene$_y$)$_m$ block, wherein x is about 2.5 wt % to about 10 wt %, y is from about 90 wt % to about 97.5 wt %, x+y is about 97.5 wt % to 100 wt %, and m is from about 70 wt % to about 80 wt %;
(c) charging a conjugated diene monomer and allowing polymerization to occur, to produce a conjugated diene block;
(d) charging a randomizer, an initiator, and a conjugated diene/monovinylarene monomer mixture and allowing polymerization to occur, to produce a random (conjugated diene$_x$/monovinylarene$_y$)$_{m1}$ block, wherein x1 is about 2.5 wt % to about 10 wt %, y1 is from about 90 wt % to about 97.5 wt %. x1+y1 is about 97.5 wt % to 100 wt %, and m1 is from about 70 wt % to about 80 wt %;
(e) charging a conjugated diene monomer and allowing polymerization to occur, to produce a conjugated diene block; and
(f) charging the reaction mixture with a coupling agent, to form monovinylarene/conjugated diene block copolymer.

15. A monovinylarene/conjugated diene block copolymer, produced according to the method of claim 14.

16. A method of fabricating an article, comprising:
forming a monovinylarene/conjugated diene block copolymer into the article, wherein the monovinylarene/conjugated diene block copolymer comprises (i) a random (conjugated diene$_x$/monovinylarene$_y$)$_m$ block, wherein x is about 2.5 wt % to about 10 wt %, y is from about 90 wt % to about 97.5 wt %, and x+y is about 97.5 wt % to 100 wt %; and (ii) a (conjugated diene)$_n$ block; wherein n is from about 20 wt % to about 30 wt %, m is from about 70 wt % to about 80 wt %, and m+n is from about 90 wt % to 100 wt %.

17. The method of claim 16, wherein forming comprises sheet extrusion, thermoforming, injection molding, blow molding, film blowing, or film casting.

18. A monovinylarene/conjugated diene block copolymer, comprising the structure:
(B/S)-B-CA,
wherein (B/S) is a random monovinylarene/conjugated diene block; B is a conjugated diene block; CA is a coupling agent residue; and —is a covalent linkage between blocks, and
wherein the monovinylarene/conjugated diene block copolymer further comprises a second structure selected from the group consisting of (a) a (B/S) block covalently linked to the (B/S) block of the (B/S)-B-CA structure, (b) a (B/S)-(B/S)-B structure covalently linked to the (B/S) block of the (B/S)-B-CA structure, (c) a (B/S)-B structure covalently linked to the (B/S) block of the (B/S)-B-CA structure, and (d) an S-(B/S)-B- structure covalently linked to the (B/S) block of the (B/S)-B-CA structure, wherein S is a monovinylarene block.

19. The monovinylarene/conjugated diene block copolymer of claim 18, wherein the second structure is a (B/S) block covalently linked to the (B/S) block of the (B/S)-B-CA structure.

20. The monovinylarene/conjugated diene block copolymer of claim 18, wherein the second structure is a (B/S)-(B/S)-B structure covalently linked to the (B/S) block of the (B/S)-B-CA structure.

21. The monovinylarene/conjugated diene block copolymer of claim 18, wherein the second structure is a (B/S)-B structure covalently linked to the (B/S) block of the (B/S)-B-CA structure.

22. The monovinylarene/conjugated diene block copolymer of claim 18, wherein the second structure is a S-(B/S)-B- structure covalently linked to the (B/S) block of the (B/S)-B-CA structure, wherein S is a monovinylarene block.

23. A monovinylarene/conjugated diene block copolymer, comprising the structure:
<B/S>2-<B/S>3-<B/S>4-<B/S>5-CA,
wherein <B/S> is a tapered monovinylarene/conjugated diene block; <B/S>2 has a conjugated diene content from about 2.5 wt % to about 10 wt %, <B/S>3, <B/S>4, and <B/S>5 have a conjugated diene content from about 30 wt % to about 70 wt %, and CA is a coupling agent residue.

24. The monovinylarene/conjugated diene block copolymer of claim 23, further comprising a <B/S>1 block covalently linked to the <B/S>2 block of the <B/S>2-<B/S>3-<B/S>4-<B/S>5-CA structure, wherein <B/S>1 has a conjugated diene content from about 2.5 wt % to about 10 wt %.

25. A monovinylarene/conjugated diene block copolymer, comprising the structure:
(B/S)1-(B/S)2-<B/S>3-<B/S>4-<B/S>5-CA,
wherein (B/S) is a random monovinylarene/conjugated diene block; <B/S> is a tapered monovinylarene/conjugated diene block; CA is a coupling agent residue; —is a covalent linkage between blocks; (B/S)1 and (B/S)2 each have a conjugated diene content from about 2.5 wt % to about 10 wt %; and <B/S>3, <B/S>4, and <B/S>5 each have a conjugated diene content from about 30 wt % to about 70 wt %.

26. A monovinylarene/conjugated diene block copolymer, comprising the structure:
(B/S)1-(B/S)2-(B/S)3-(B/S)4-(B/S)5-CA,
wherein (B/S) is a random monovinylarene/conjugated diene block; CA is a coupling agent residue; —is a covalent linkage between blocks; (B/S)1 and (B/S)2 each have a conjugated diene content from about 2.5 wt % to about 10 wt %; and (B/S)3, (B/S)4, and (B/S)5 each have a conjugated diene content from about 30 wt % to about 70 wt %.

* * * * *

UNITED STATES PATENT AND TRADEMARK OFFICE
CERTIFICATE OF CORRECTION

| | | |
|---|---|---|
| PATENT NO. | : 7,037,980 B2 | Page 1 of 1 |
| APPLICATION NO. | : 10/705704 | |
| DATED | : May 2, 2006 | |
| INVENTOR(S) | : Nathan E. Stacy, Larry L. Nash and John D. Hottovy | |

It is certified that error appears in the above-identified patent and that said Letters Patent is hereby corrected as shown below:

In column 11, claim 14, line 35, delete "$diene_x/monovinylarene_y)_{ml}$" and insert -- $diene_{x1}/monovinylarene_{y1})_{ml}$ -- .

In column 11, claim 14, line 37, delete "97.5 wt %." (first instance) and insert -- 97.5 wt %, -- .

Signed and Sealed this

Eighteenth Day of December, 2007

JON W. DUDAS
*Director of the United States Patent and Trademark Office*